Dec. 14, 1954  F. W. CALLOWAY  2,696,687
VEHICLE OPERATED VERTICAL GATE OPENER
Filed June 11, 1953  2 Sheets-Sheet 1
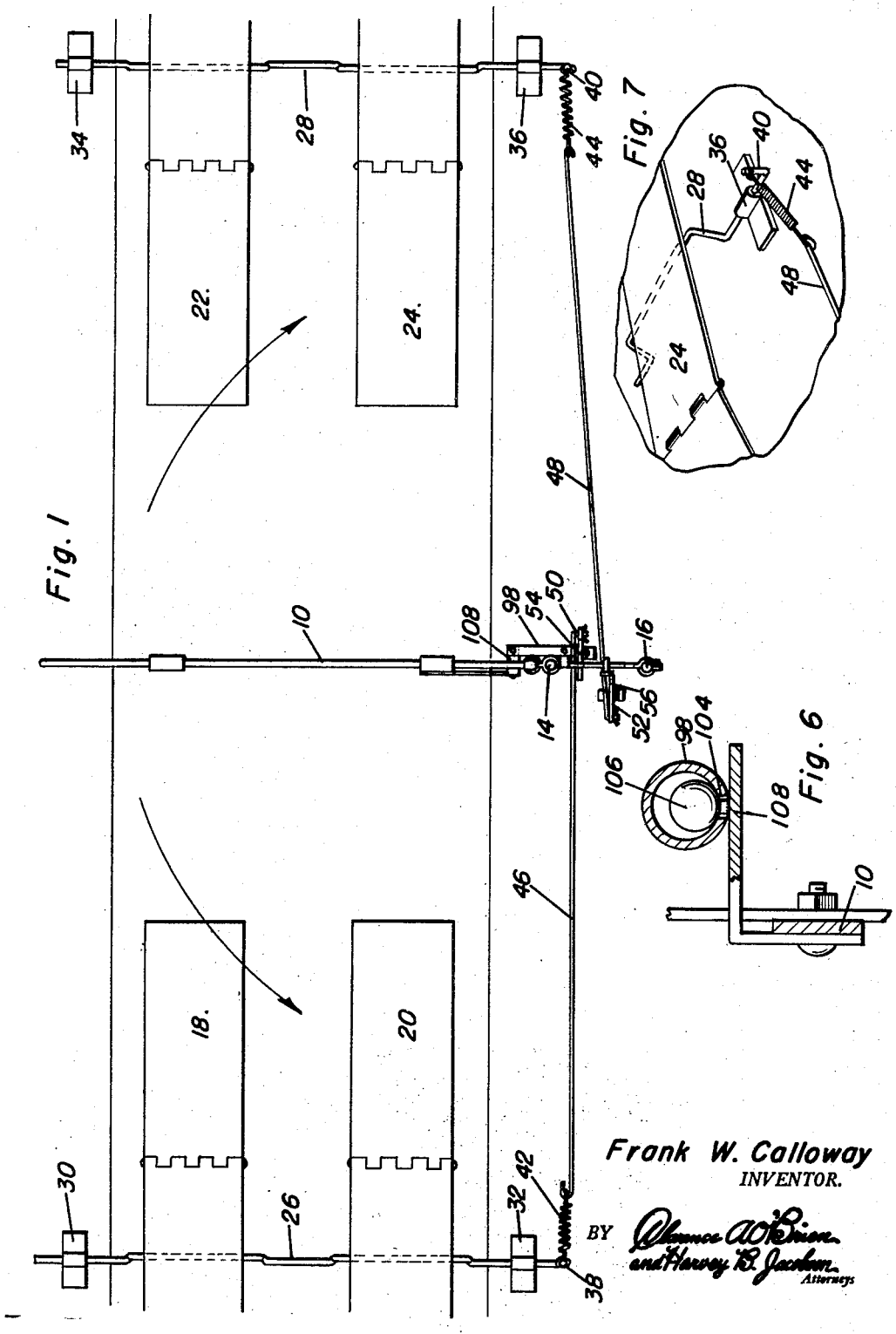
Frank W. Calloway
INVENTOR.

Dec. 14, 1954  F. W. CALLOWAY  2,696,687
VEHICLE OPERATED VERTICAL GATE OPENER
Filed June 11, 1953                    2 Sheets-Sheet 2
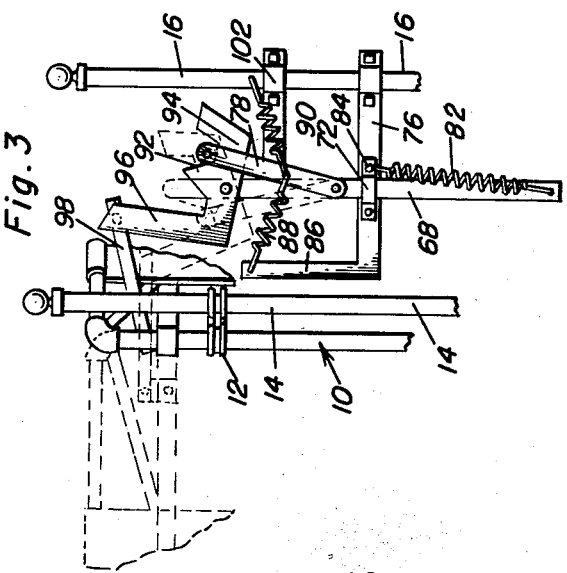
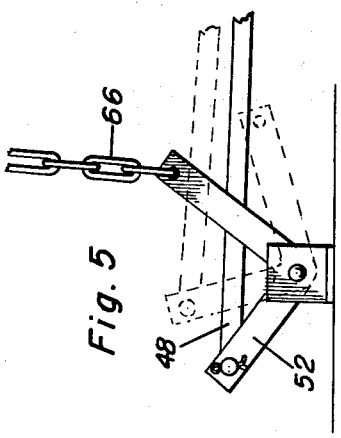
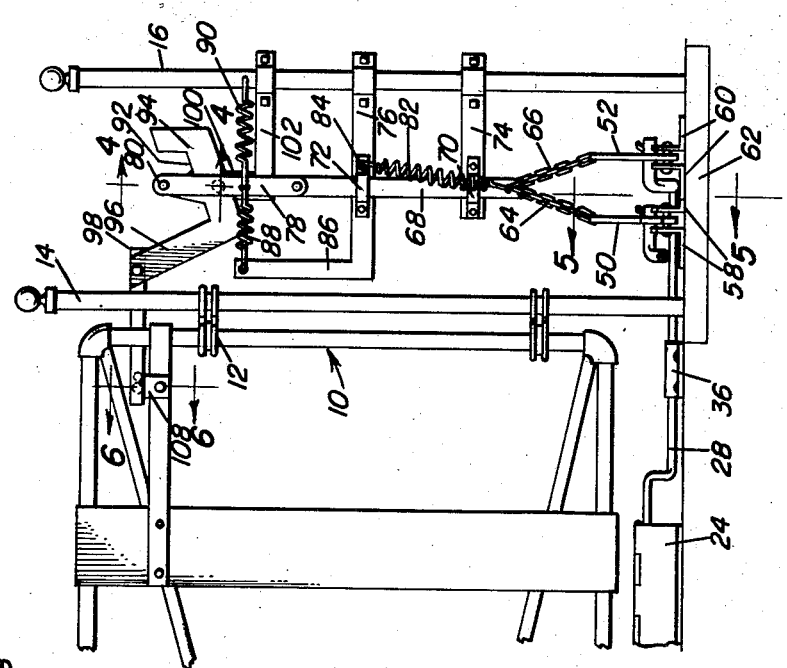
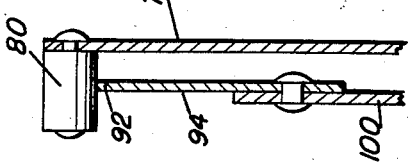
Frank W. Calloway
INVENTOR.

United States Patent Office 2,696,687
Patented Dec. 14, 1954

2,696,687

VEHICLE OPERATED VERTICAL GATE OPENER

Frank W. Calloway, Mountain Creek, Ala.

Application June 11, 1953, Serial No. 360,903

5 Claims. (Cl. 39—22)

This invention relates to a mechanical linkage adapted to automatically open a closure device such as a gate, the mechanical means utilized in this gate opener being readily adaptable for various other purposes.

The primary object of this invention is to provide a means for transmitting the energy of an automobile or vehicle through its application of force upon a suitable treadle and through a linkage controlled by the pedal to a gate opening mechanism which is adapted to open the gate to permit passage of the vehicle.

The construction of this invention features an operating arm which is connected by flexible chains to rocker arms actuated by the foot treadle. The operating arm has pivotally mounted thereon a link carrying a roller which engages an eccentric member to actuate a lever controlling the opening and closing of the gate.

Still further objects and features of the invention reside in the provision of a gate opener or mechanism for suitable and desired purposes that is strong and durable, simple in operation and construction, capable of being readily attached to various existing structural elements such as gates and the like, and which is relatively inexpensive to produce while being positive in operation.

These, together with the various ancillary objects and features of the invention which will become apparent as the following description proceeds, are attained by this device, a preferred embodiment of which has been illustrated in the accompanying drawings, by way of example only, wherein:

Figure 1 is a top plan view of the device comprising the present invention as applied to a gate;

Figure 2 is a side elevational view of the mechanical means utilized in transferring energy from the pairs of treadles to open the gate;

Figure 3 is an elevational detail view illustrating the position of the various elements of the invention after the linkage has been actuated;

Figure 4 is a vertical sectional view as taken along the plane of line 4—4 in Figure 2 illustrating the construction of the actuating link and pivoted eccentric;

Figure 5 is a vertical sectional view as taken along the plane of line 5—5 in Figure 2 illustrating the construction of the rocker arms;

Figure 6 an enlarged sectional detail view illustrating the ball and socket joint connection between the bracket mounted on the gate and lever attached to the eccentric; and, Figure 7 is a perspective view illustrating the construction of the vehicle operated treadle.

With continuing reference to the accompanying drawings wherein like reference numerals designate similar parts throughout the various views, reference numeral 10 generally designates a gate or other similar closure element in combination with which the operating mechanism to henceforth disclose comprises the present invention. The gate 10 is hingedly mounted by means of suitable hinges 12 on an inner gate post 14. An outer gate post 16 is provided for supporting the actuating mechanism for opening and closing the gate 10. This actuating mechanism in toto includes treadles 18, 20, 22 and 24 which are adapted to be engaged by the wheels of a vehicle desiring to enter or leave through the gate 10. The treadles consists of hinged halves which are normally held in an upper position by crank rods 26 and 28 having offset portions which engage the underneath part of the treadles. The crank rods 26 and 28 are journalled in bearings 30 and 32 and 34 and 36 respectively. The crank rods 26 and 28 terminate in elbows 38 and 40 which have an end of springs 42 and 44 secured respectively thereto. The other end of the springs 42 and 44 are respectively secured to rods 46 and 48 each of which are pivotally attached to one leg 50 and 52 respectively of rocker arms 54 and 56. The rocker arms 54 and 56 are pivotally mounted between pairs of angle iron supports 58 and 60 respectively, which are supported by a base slab 62. The rocker arms 54 and 56 have attached thereto link chains 64 and 66 which are attached at their upper ends to the lower portions of an operating arm 68.

Secured to the base slab 62 are the outer and inner vertically extending gate posts 14 and 16. The operating arm 68 extends through guide brackets 70 and 72 carried by guide members 74 and 76 which are bolted or otherwise secured to the outer gate post 16. The guide brackets 70 and 72 permit vertical sliding movement of the operating arm 68 but prevent rotation and displacement in any other direction thus restraining the operating arm 68 to one degree of freedom. Pivotally attached to the upper end of the operating arm 68 is an operating link 78 which carries a roller 80 at the upper end thereof. A coil spring 82 is terminally connected to the lower end of the operating arm 68 and to one of the fasteners as at 84 used in securing the guide bracket 72 to the guide member 76. The guide member 76 has an outwardly extending portion 86 to which one end of a coil spring 88 is attached. The other end of the coil spring 88 is attached to the operating lever 78. Likewise, a coil spring 90 is terminally attached to the outer gate post 16 and the operating link 78.

The roller 80 is adapted to ride over a substantially U-shaped cam surface 92 of an eccentric member 94 having a leg 96 pivotally attached to a lever 98. The eccentric 94 is mounted for pivotal movement on a vertically extending limb 100 of a guide member 102 which is bolted or otherwise secured to the gate post 16. The eccentric 94 is of substantially W-shape and when pivoted will cause movement of the lever 98. This lever 98 is preferably of tubular cylindrical shape and has a slot 104 therein together with a suitable aperture so that the ball 106 attached to a bracket 108 can be seated. Thus, the lever 98 and the ball 106 form an effective ball and socket joint. The slot 104 is very short in length so that comparatively slight motion of the eccentric 94 will cause motion of the lever 98 and hence of the bracket 108. The bracket 108 is bolted or otherwise secured to a portion of the gate 10.

In operation, when any of the treadles 18, 20, 22 or 24 are depressed by the wheels of a vehicle passing thereover, the rods 46 and 48 will be actuated which will in turn operate the respective rocker arms 54 and 56. Drawing down on the chains 64 and 66 will cause the operating arm 68 to descend vertically which causes the operating link 78 to have the roller engage the cam surface 92 on the eccentric 94. This tilts the eccentric 94 to the position as is shown in Figure 3 from the position shown in Figure 2. The movement of the eccentric 94 will cause movement of the lever 98 which transmits the motion to the gate 10 and opens the gate. Upon passage of the vehicle over the treadles the springs 42 and 44 together with the spring 82 and the springs 88 and 90 will cause the device to return to its original position as is shown in Figure 2. As is noted, when the vertical operating arm 68 is lowered the operating link 78 is moved downwardly and canted from the center position. The springs 88 and 90 are especially adapted to restore the link 78 at its central position. The roller 80 on the link 78 will continuously engage the eccentric 94 restoring it to its initial position.

Since from the foregoing, the construction and advantages of this gate opener are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to as desired.

What is claimed as new is as follows:

1. A device for opening closure elements comprising a pair of rocker arms, means for actuating said rocker arms attached thereto, a vertical operating arm, means attaching said rocker arms to said operating arm, guide means for supporting said operating arm for vertical movement thereof, an operating link pivotally attached to said operating arm, resilient means urging said operating link to urge said link to retain a vertical position, an eccentric member mounted for pivotal movement on said guide means, said operating link engaging said eccentric member, a lever pivotally attached to said eccentric member, and spring means terminally attached to said guide means to return said eccentric member to a raised position after depression by said operating link upon actuation of a rocker arm, said operating link including a roller carried thereby said roller riding on said eccentric to urge said eccentric downwardly when said operating link is pivoted from a vertical position.

2. A device for opening closure elements comprising a pair of rocker arms, means for actuating said rocker arms attached thereto, a vertical operating arm, means attaching said rocker arms to said operating arm including chains terminally attached to said rocker arms and said operating arm, guide means for supporting said operating arm for vertical movement thereof, an operating link pivotally attached to said operating arm, resilient means urging said operating link to urge said link to retain a vertical position, an eccentric member mounted for pivotal movement on said guide means, said operating link engaging said eccentric member, a lever pivotally attached to said eccentric member, and spring means terminally attached to said guide means to return said eccentric member to a raised position after depression by said operating link upon actuation of a rocker arm, said operating link including a roller carried thereby said roller riding on said eccentric to urge said eccentric downwardly when said operating link is pivoted from a vertical position.

3. A device for opening closure elements comprising a pair of rocker arms, means for actuating said rocker arms attached thereto, a vertical operating arm, means attaching said rocker arms to said operating arm including chains terminally attached to said rocker arms and said operating arm, guide means for supporting said operating arm for vertical movement thereof, an operating link pivotally attached to said operating arm, resilient means urging said operating link to urge said link to retain a vertical position, an eccentric member mounted for pivotal movement on said guide means, said operating link engaging said eccentric member, a lever pivotally attached to said eccentric member, and spring means terminally attached to said guide means to return said eccentric member to a raised position after depression by said operating link upon actuation of a rocker arm, said operating link including a roller carried thereby said roller riding on said eccentric to urge said eccentric downwardly when said operating link is pivoted from a vertical position, said lever having a socket therein, a bracket attached to a closure element, a ball attached to said bracket, said ball seating in said socket.

4. A device for opening closure elements comprising a pair of rocker arms, means for actuating said rocker arms attached thereto, a vertical operating arm, means attaching said rocker arms to said operating arm including chains terminally attached to said rocker arms and said operating arm, guide means for supporting said operating arm for vertical movement thereof, an operating link pivotally attached to said operating arm, resilient means urging said operating link to urge said link to retain a vertical position, an eccentric member mounted for pivotal movement on said guide means, said operating link engaging said eccentric member, a lever pivotally attached to said eccentric member, and spring means terminally attached to said guide means to return said eccentric member to a raised position after depression by said operating link upon actuation of a rocker arm, said operating link including a roller carried thereby said roller riding on said eccentric to urge said eccentric downwardly when said operating link is pivoted from a vertical position, said lever having a socket therein, a bracket attached to a closure element, a ball attached to said bracket, said ball seating in said socket, said closure means comprising a gate, an outer gate post, said guide means comprising spaced guides carried by said outer gate post, an inner gate post, said gate being hingedly secured on said outer gate post.

5. A device for opening closure elements comprising a pair of rocker arms, means for actuating said rocker arms attached thereto, a vertical operating arm, means attaching said rocker arms to said operating arm including chains terminally attached to said rocker arms and said operating arm, guide means for supporting said operating arm for vertical movement thereof, an operating link pivotally attached to said operating arm, resilient means urging said operating link to urge said link to retain a vertical position, an eccentric member mounted for pivotal movement on said guide means, said operating link engaging said eccentric member, a lever pivotally attached to said eccentric member, and spring means terminally attached to said guide means to return said eccentric member to a raised position after depression by said operating link upon actuation of a rocker arm, said operating link including a roller carried thereby said roller riding on said eccentric to urge said eccentric downwardly when said operating link is pivoted from a vertical position, said lever having a socket therein, a bracket attached to a closure element, a ball attached to said bracket, said ball seating in said socket, said closure means comprising a gate, an outer gate post, said guide means comprising spaced guides carried by said outer gate post, an inner gate post, said gate being hingedly secured on said outer gate post, said resilient means comprising normally horizontal coil springs, one of said coil springs being terminally attached to one of said guides, and to said operating links, the other of said coil springs being terminally attached to said outer gate post and said operating link.

References Cited in the file of this patent

UNITED STATES PATENTS

| Number | Name | Date |
|---|---|---|
| 1,098,235 | Driscoll | May 26, 1914 |
| 1,214,594 | Sand | Feb. 6, 1917 |
| 1,268,815 | Brazeal | June 11, 1918 |

FOREIGN PATENTS

| Number | Country | Date |
|---|---|---|
| 414,421 | Great Britain | Aug. 9, 1934 |